US012647051B2

(12) United States Patent
Yoo et al.

(10) Patent No.: US 12,647,051 B2
(45) Date of Patent: Jun. 2, 2026

(54) IONIC HYDROGEL-BASED ENERGY HARVESTER

(71) Applicant: PUKYONG NATIONAL UNIVERSITY INDUSTRY-UNIVERSITY COOPERATION FOUNDATION, Busan (KR)

(72) Inventors: Seong Il Yoo, Busan (KR); Ja Min Koo, Busan (KR); Merreta Noorenza Biutty, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 295 days.

(21) Appl. No.: 18/639,155

(22) Filed: Apr. 18, 2024

(65) Prior Publication Data

US 2024/0266973 A1 Aug. 8, 2024

Related U.S. Application Data

(63) Continuation of application No. PCT/KR2022/005874, filed on Apr. 25, 2022.

(30) Foreign Application Priority Data

Oct. 26, 2021 (KR) ........................ 10-2021-0143859

(51) Int. Cl.
*H02N 1/08* (2006.01)
*H01M 10/0565* (2010.01)
*H02N 1/04* (2006.01)
*H02N 2/18* (2006.01)

(52) U.S. Cl.
CPC .................................... *H02N 1/08* (2013.01)

(58) Field of Classification Search
CPC ....... H01M 10/0565; H02N 1/04; H02N 1/08; H02N 2/18
See application file for complete search history.

(56) References Cited

FOREIGN PATENT DOCUMENTS

| KR | 101146564 B1 * | 5/2012 | ............... H02N 2/18 |
| KR | 10-2017-0075318 A | 7/2017 | |
| KR | 10-2020-0129064 A | 11/2020 | |

OTHER PUBLICATIONS

18639155_2026-03-11_KR_101146564_B1_H.pdf (Year: 2026).*

* cited by examiner

*Primary Examiner* — Christopher M Koehler
*Assistant Examiner* — Ahmed F Seck
(74) *Attorney, Agent, or Firm* — Dinsmore & Shohl LLP; Yongsok Choi, Esq.

(57) ABSTRACT

The present invention relates to a polymer hydrogel-based ion energy harvester, which is designed to harvest low-frequency mechanical vibrations by using slow diffusion of ions, as an alternative to a conventional energy harvesting technique based on electron transfer or electron conduction. The ionic hydrogel-based energy harvester according to the present invention has very superior advantages compared with existing methods in terms of extracted current density, manufacturing cost, manufacturing method, and the like, by manufacturing energy elements through simple stacking of polymer hydrogels.

12 Claims, 14 Drawing Sheets

Metal electrode

Soft hydrogel

Ion-selective hydrogel

Hard hydrogel

Metal electrode

FIGURE 2A                                  FIGURE 2B
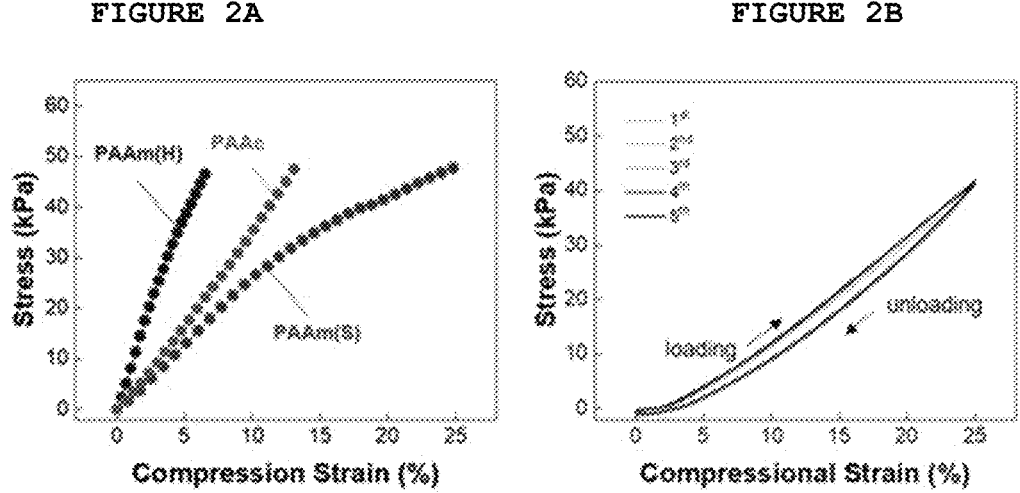
FIGURE 2C                                  FIGURE 2D
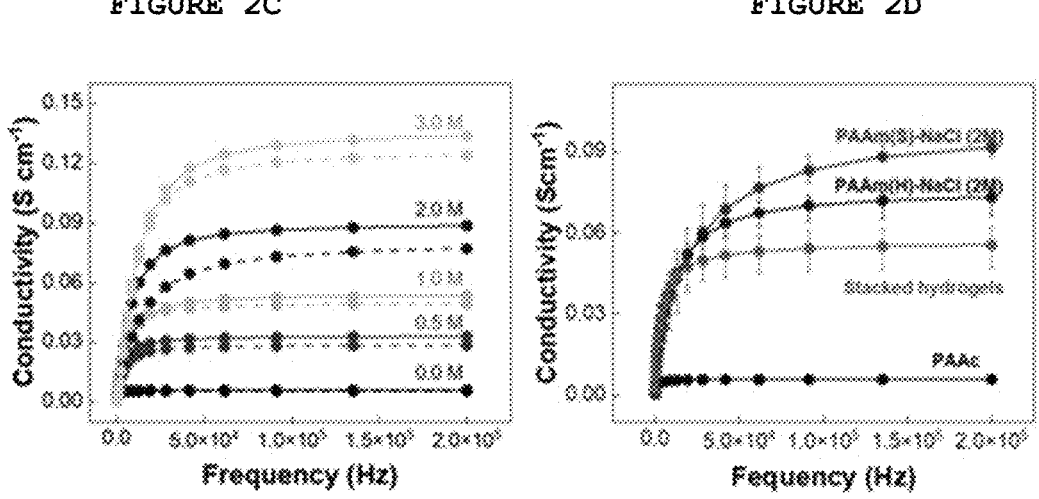

FIGURE 5A                    FIGURE 5B
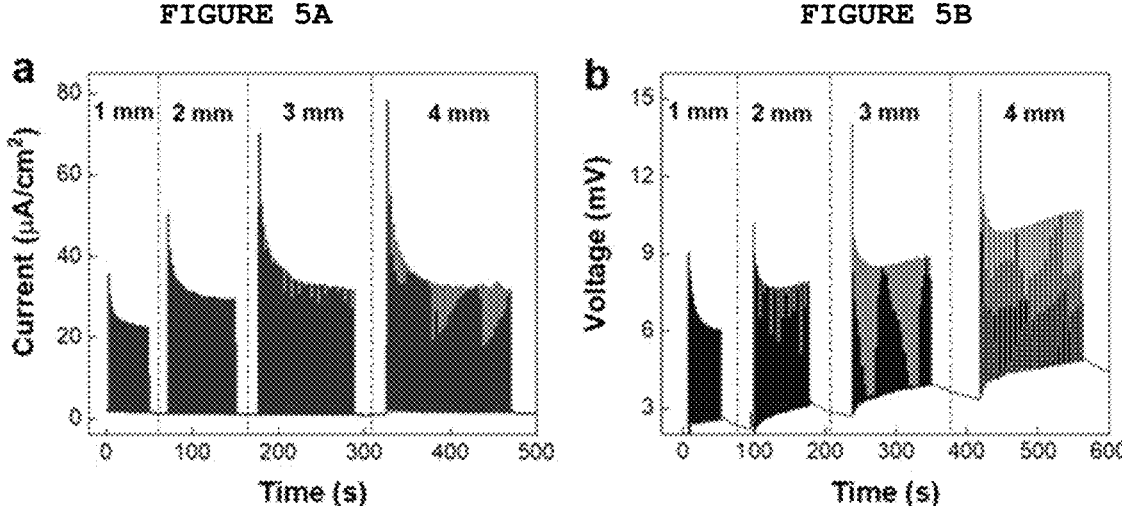

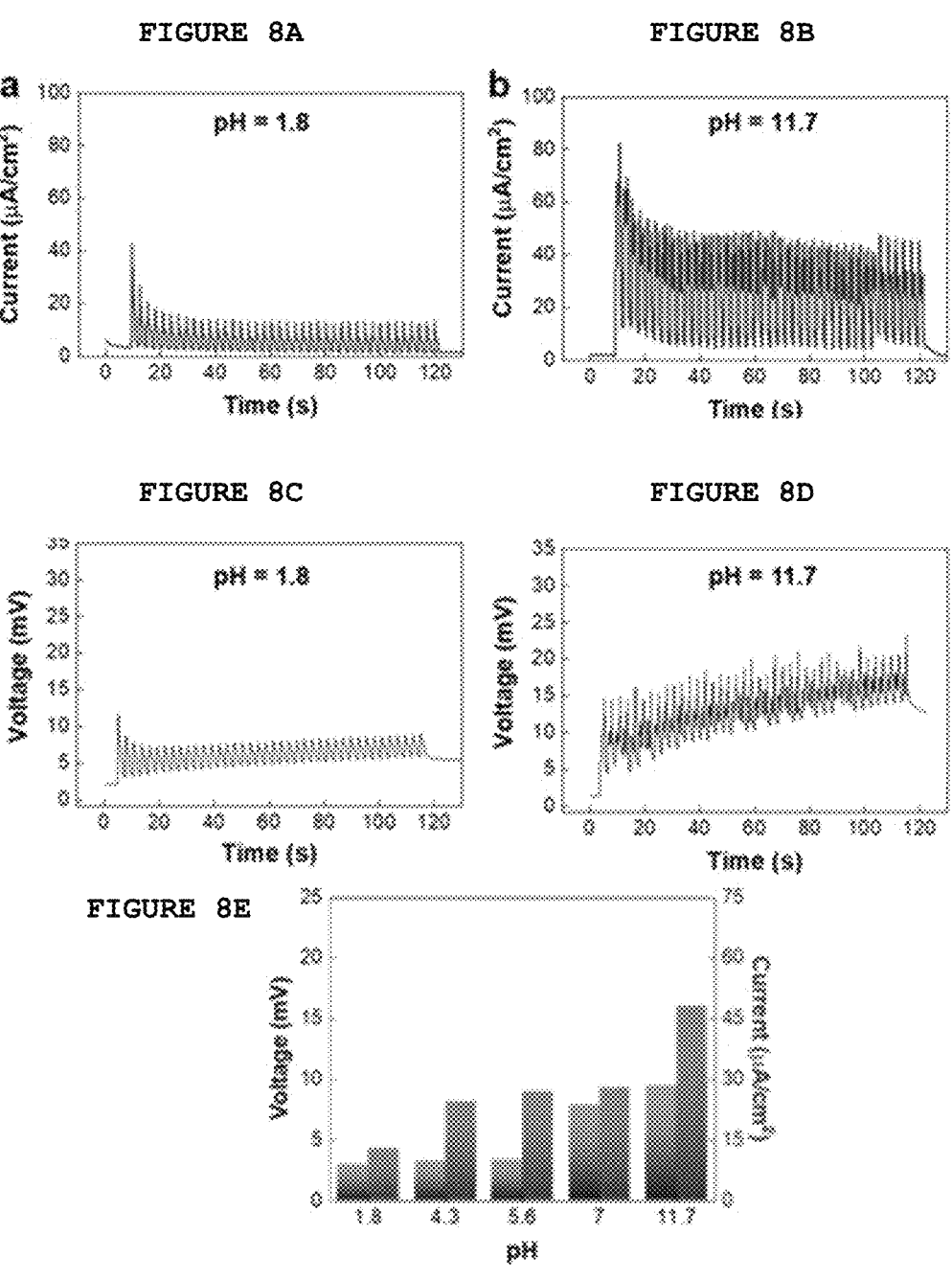

FIGURE 11A                 FIGURE 11B
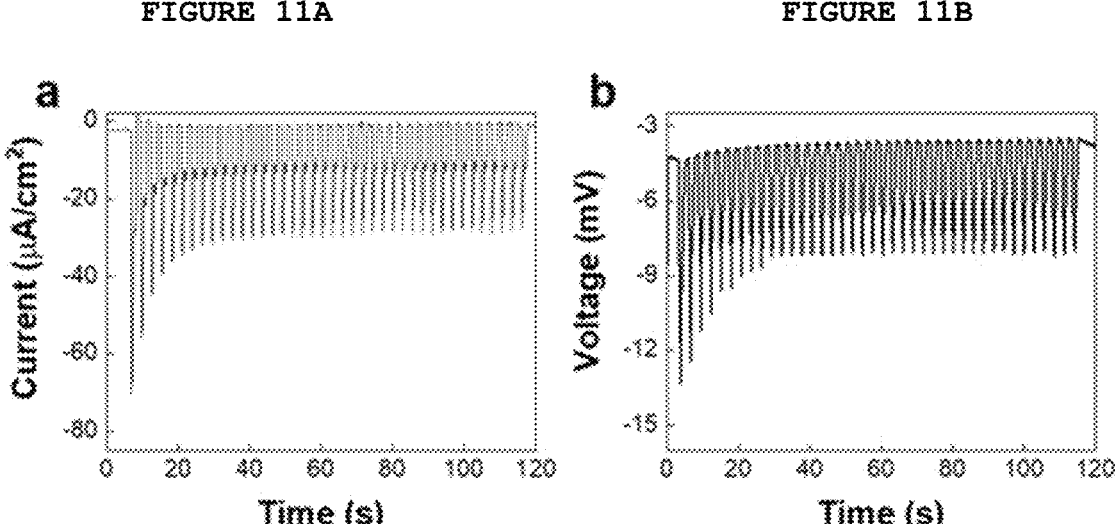

FIGURE 12A                    FIGURE 12B
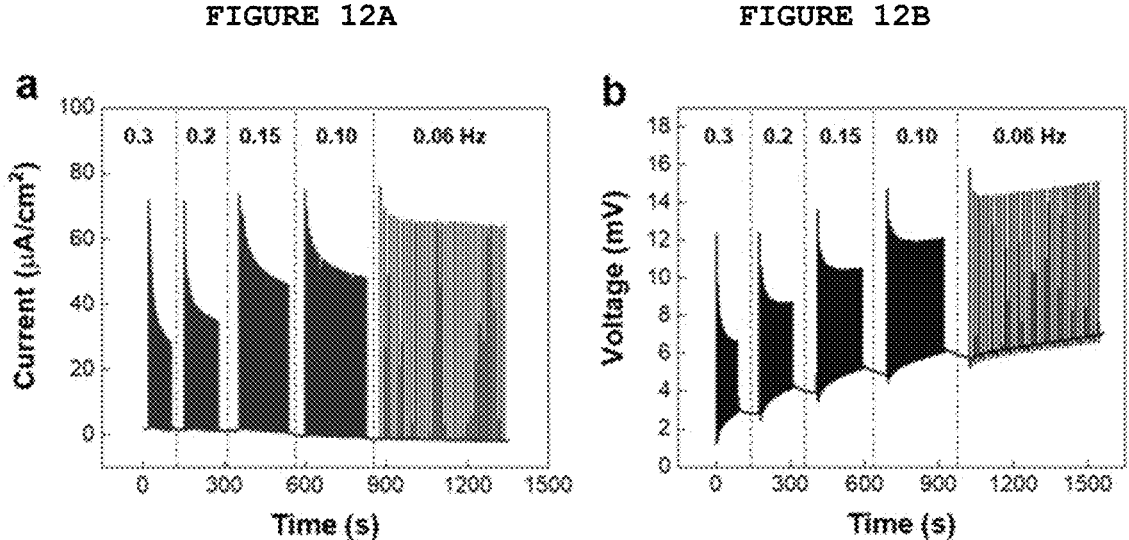

FIGURE 14A    FIGURE 14B    FIGURE 14C

IONIC HYDROGEL-BASED ENERGY HARVESTER

CROSS-REFERENCE TO RELATED APPLICATIONS

This application is a continuation of International Application No. PCT/KR2022/005874 filed on Apr. 25, 2022, which claims priority to Korean Application No. 10-2021-0143859 filed on Oct. 26, 2021, the entire contents of which are herein incorporated by reference.

TECHNICAL FIELD

The present disclosure relates to an ionic hydrogel-based energy harvester. More specifically, the present disclosure relates to a polymer hydrogel-based ion energy harvester designed to harvest energy from low-frequency mechanical vibrations using slow diffusion of ions as an alternative to existing energy harvesting technologies based on electron transfer or electron conduction.

BACKGROUND ART

A polymer hydrogel is a material made of a polymer with a three-dimensional network structure containing a large amount of water. When a salt such as LiCl, NaCl, or KCl is introduced into the polymer hydrogel or an ionic liquid is introduced, an ionic gel capable of ion conduction is formed.

When a polymer molecular structure forming a molecular hydrogel has a charge, the movement of cations or anions can be controlled. For example, when the molecular structure of the polymer forming a hydrogel contains anions, the penetration of anions approaching from the outside is blocked by electrostatic repulsion, but the penetration of cations approaching from the outside proceeds smoothly.

An energy harvester is a device that acquires energy transformed or destroyed in its natural state and then converts the energy into a usable form. The energy harvester is also called an energy scavenger because the energy harvester collects wasted energy.

Disclosed conventional technologies related to the energy harvester include a trioelectric energy harvester based on electrostatic force (Korean Patent Application Publication No. 10-2020-0129064) and a piezoelectric energy harvester based on piezoelectric power (Korean Patent Application Publication No. 10-2017-0075318).

As mentioned, the most representative conventional energy harvesting technologies are trioelectric-based and piezoelectric-based technologies. Since the electrostatic force and piezoelectric devices have a low extracted current density, the formation of materials and devices to overcome the disadvantages is complicated.

SUMMARY

Technical Problem

The present inventors researched to solve the problems of the conventional arts as described above. The present inventors discovered that an energy harvester that converts vibrational energy from the outside into electrical energy can be manufactured by layering ionic hydrogels with different mechanical properties and hydrogels with cation-permeable characteristics, and completed the present disclosure.

Therefore, one objective of the present disclosure is to provide a polymer hydrogel-based ion energy harvester that harvests energy from low-frequency mechanical vibrations using slow diffusion of ions.

The other objective of the present disclosure is to provide a use of the polymer hydrogel-based ion energy harvester.

Technical Solution

To achieve the objectives, the present disclosure provides an ionic hydrogel-based energy harvester including layered hydrogels, the ionic hydrogel-based energy harvester including:

a soft polymer hydrogel layer;

a polymer hydrogel layer layered on the soft polymer hydrogel layer and having ion selectivity; and a hard polymer hydrogel layer layered on the polymer hydrogel layer having the ion selectivity.

In one embodiment of the present disclosure, the polymer hydrogel layer having the ion selectivity may allow selective movement of cations therethrough.

In another embodiment of the present disclosure, the degree of compression of the soft polymer hydrogel is greater than that of the hard hydrogel when external pressure is applied. This causes the soft hydrogel layer to be selectively compressed, whereby cations and anions dissolved in the soft polymer hydrogel layer move toward the hard polymer hydrogel layer.

In yet another embodiment of the present disclosure, the compressed soft polymer hydrogel layer can be restored to an initial state thereof when the external pressure is removed.

In yet another embodiment of the present disclosure, the soft polymer hydrogel layer of the energy harvester experiences repetitive compression and expansion when an external pressure or external vibration is repeatedly applied to the ionic hydrogel-based energy harvester, and the compression and expansion cause ions to move to the hard polymer hydrogel layer, whereby the ionic hydrogel-based energy harvester supplies electrical energy to an external component.

In yet another embodiment of the present disclosure, the soft polymer hydrogel layer may be a soft polyacrylamide (PAAm) hydrogel layer, the hard polymer hydrogel layer may be a hard polyacrylamide (PAAm) hydrogel layer, and the polymer hydrogel layer having ion selectivity may be a cross-linked polyacrylic acid (PAAc) hydrogel layer.

In yet another embodiment of the present disclosure, the soft polymer hydrogel layer may be a soft polyacrylamide (PAAm) hydrogel layer, the hard polymer hydrogel layer may be a hard polyacrylamide (PAAm) hydrogel layer, and the polymer hydrogel layer having the ion selectivity may be a layer made of a mixture of polyacrylamide and a charged polymer electrolyte.

In yet another embodiment of the present disclosure, the charged polymer electrolyte may be selected from the group consisting of poly(sodium 4-styrenesulfonate), sodium polyacrylic acid, and crystalline nanocellulose.

In yet another embodiment of the present disclosure, the layered hydrogels may have a total thickness in a range of 1 mm to 20 mm.

In yet another embodiment of the present disclosure, the layered hydrogels may be placed between two metal electrodes attached to an acrylic plate.

In the other embodiment of the present disclosure, the open circuit voltage, short circuit current density, and power of the energy harvester may increase as the vibration frequency of the energy harvester decreases.

In addition, to achieve the objectives, the present disclosure provides a self-powered ionotropic device including the ionic hydrogel-based energy harvester.

Advantageous Effects

An ionic hydrogel-based energy harvester of the present disclosure manufactures an energy device by simply layering polymer hydrogel. Thus, the energy harvester is superior to existing methods in terms of extracted current density, manufacturing cost, and manufacturing method.

In addition, the ionic hydrogel-based energy harvester of the present disclosure can be prepared using the knowledge of simple polymer chemistry without complex material synthesis and device design, so the energy harvester can be used as a soft and flexible power source for many self-powering applications in the low-frequency range.

DESCRIPTION OF DRAWINGS

FIG. 2A shows compressive stress-strain curves of PAAm (S) (red), PAAm(H) (blue), and PAAc (green), respectively, FIG. 2B shows the results of a cyclic compression test with layered PAAm(S)/PAAc/PAAm(H) hydrogels under the condition of up to 25% strain, FIG. 2C shows the ionic conductivity of PAAm(S) (solid line) and PAAm(H) (dashed line) hydrogels with various NaCl concentrations, FIG. 2D shows the ionic conductivity of layered PAAm(S)/PAAc/PAAm(H) hydrogels (black) compared to the component hydrogel, and the concentration of NaCl was adjusted to 2.0 M for both PAAm(S) and PAAm(H) hydrogels and 0.0 M for the PAAc hydrogel;

FIGS. 5A and 5B show the short-circuit current density and open-circuit voltage, respectively, of a device with layered PAAm(S)/PAAc/PAAm(H) hydrogels at different compressed thicknesses;

FIGS. 8A and 8B show the short-circuit current density of a device with a PAAm(S)/PAAc/PAAm(H) hydrogel, FIGS. 8C and 8D show the open circuit voltage of a device with a PAAc hydrogel under a condition of controlled pH, and FIGS. 8A and 8C and FIGS. 8B and 8D show results of each device under controlled pH conditions at 1.8 and at 11.7, respectively, FIG. 8E shows the output performance of the same device under various pH conditions, and the pH of the PAAc hydrogel was adjusted by adding NaOH to an acrylic acid monomer solution;

FIGS. 9A, 9C, and 9E show the short-circuit current densities of hydrogel devices using different types of cation-selective hydrogels, FIGS. 9B, 9D, and 9F show the open circuit voltage of the devices, FIGS. 9A and 9B, FIGS. 9C and 9D, and FIGS. 9E and 9F show the results of the devices with PAAm (PSS), PAAm (PSA), and PAAM (CNC) hydrogels, respectively.

FIGS. 11A and 11B show the short-circuit current density and the open circuit voltage of a device with a PAAm(S)/PAAc/PAAm(H) hydrogel in reverse polarity connection;

FIGS. 12A and 12B show the short-circuit current density and the open-circuit voltage of a device with layered PAAm (S)/PAAc/PAAm(H) hydrogels at different vibration frequencies;

FIGS. 13A and 13B show the frequency-dependent output performance of a device with four cells of a PAAm(S)/PAAc/PAAm(H) hydrogel in series connection at vibration frequencies of 0.3 Hz and 0.08 Hz, the device was connected to various external resistances (R) to measure power density, FIGS. 13D and 13E show the single-cell device application of a PAAm(S)/PAAc/PAAm(H) hydrogel for a self-powered system, FIG. 13C shows comparison the frequency-dependent power density of conventional energy harvester and ion devices in a low-frequency region and FIG. 13D is a current obtained in gait walking at different frequencies (speeds), and FIG. 13E shows a UV-Vis spectrum over time for the electrochemical synthesis of Au nanoparticles;

FIGS. 14A to 14C show transmission electron microscope (TEM) images of synthesized Au nanoparticles, and the EDX elemental maps of Au are shown in yellow, respectively.

DETAILED DESCRIPTION

Figure 1:
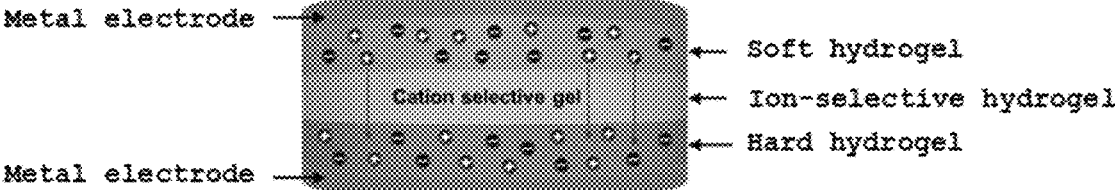
FIG. 1 shows a conceptual diagram of layered hydrogels included in the ionic hydrogel-based energy harvester of the present disclosure.

The present disclosure provides an ionic hydrogel-based energy harvester including layered hydrogels, the ionic hydrogel-based energy harvester including:

a soft polymer hydrogel layer;

a polymer hydrogel layer layered on the soft polymer hydrogel layer and having ion selectivity; and a hard polymer hydrogel layer layered on the polymer hydrogel layer having the ion selectivity.

In the present disclosure, a polymer hydrogel was manufactured through a well-known synthesis method. More specifically, polyamide and poly(acrylic acid) are used in the present disclosure, but the present disclosure is not limited thereto.

The soft polymer may include but is not limited to, polyamide, which has relatively soft physical properties through the addition of a relatively small amount of cross-linking agent during polymer synthesis.

The hard polymer may include but is not limited to, polyamide, which has relatively soft physical properties through the addition of a relatively large amount of cross-linking agent during polymer synthesis.

Even though state-of-the-art piezoelectric, electromagnetic, and triboelectric energy harvesters have reached a high level of development, energy conversion efficiency decreases sharply in the low-frequency range (<1 Hz to 5 Hz), which is a frequency distribution range where vibrations in the natural environment and human movements are detected. This frequency mismatch severely limits the application of these harvesters for extracting electricity from natural vibrations and human movements.

To overcome these limitations, a new type of energy harvester based on "ion conduction" has recently been proposed by several research groups as an alternative to existing energy harvesting technologies.

In the proposed approach, mobile ions in an ionic conductor move in response to applied mechanical stress, and ion transportation gives rise to a conversion into a potential difference through a charge separation process, leading to electron flow through an external circuit.

For example, a hydrogel diode was prepared by layering two ionic hydrogels composed of oppositely charged polyelectrolytes and mobile counter ions. Due to the concentration difference in the bilayer structure, mobile counter ions (both positive and negative ions in separate hydrogels) can diffuse in opposite directions.

This creates a built-in electric potential across the gel interface that opposes the initial ion diffusion to reach equilibrium. When the ionic diode is mechanically compressed, the volume change in the hydrogel redistributed the ionic concentration across the gel interface to increase the potential difference for power generation.

In other examples, polymer-ionic liquid complexes are mechanically bent or twisted to induce ionic movement. Because cations and anions of different sizes move at different rates, each ion accumulates in a separate part of the polymer matrix, resulting in a potential difference under mechanical stress.

Other ionic conductors, such as Li alloy-based composites and 2D black phosphorus nanosheets, have also been used to develop mechanical energy harvesters. Although the detailed expertise used in chemistry and device design differed in each example, those technologies shared a common operating principle of stress-induced ion transportation for power generation.

Given that ionic conductors can exploit the slow diffusion of ions under mechanical stimulation, energy harvesters based on ionic conductors can be expected to produce electricity by harvesting energy from low-frequency natural vibrations and human movements. Although the amount of related literature is quite limited, existing results on hydrogel diodes, polymer ionic liquid composites, lithium alloy-based composites, and 2D black phosphorus nanosheets have partially demonstrated this opportunity.

However, the output performance of those technologies is still not sufficient to meet the requirements for powering small electronic devices, nor can they compete with other energy harvesting technologies such as triboelectric and piezoelectric nanogenerators.

In the literature on ion energy harvesters, Wang et al. recently reported record-high electrical outputs of an output voltage of up to 60 mV and a current density of up to 80 $\mu Acm^{-2}$ in mechanically compressed hydrogel diodes at a very low vibration frequency of 0.01 Hz. This value is smaller than the conventional electrical output of high-performance triboelectric and piezoelectric nanogenerators.

However, in this comparison, the electrical output from triboelectric and piezoelectric nanogenerators is generally obtained in the high-frequency range, whereas the electrical output obtained from ionic conductors at lower frequencies should be taken into account. It is also worth noting that triboelectric and piezoelectric nanogenerators typically require a high level of complexity in material synthesis and device design to achieve high output performance.

Defining that improving the output performance of ion energy harvesters in the low-frequency range is one of the most important challenges in this field, the present inventors determined that (a) the number of positive ions transported under a given mechanical stress and (b) the separation efficiency of the charges into positive/negative should be increased.

Based on these assumptions, the present inventors propose an ionic device composed of three hydrogels layered with each hydrogel having different stiffness and ion selectivity. Under mechanical stress, each hydrogel in the layered configuration is compressed to a different extent depending on the stiffness.

As a result, ions dissolved in the hydrogels can be transported from a soft hydrogel to a hard hydrogel by volume change, thereby realizing directional ion transport through the layered hydrogels. At the same time, by inserting the ion-selective hydrogel between the soft hydrogel and the hard hydrogel, the charge separation of cations and anions can be realized.

This simple but innovative design dramatically improved the output performance of the systematically studied ion harvester by adjusting the composition of the layered hydrogels, compressed volume, vibration frequency, and type of hydrogel/electrolyte.

Under optimized conditions, the hydrogel device of the present disclosure produced an open circuit voltage of 12 mV and a short-circuit current density of 72.5 $\mu Acm^{-2}$ at a frequency of 0.08 Hz, and the result would be similar to or higher than the record-high performance of existing ion energies.

Additionally, it was found that electrical output could be further improved by increasing ion selectivity by selecting the type of charged polymer. To demonstrate practical aspects, the inventors implanted ionic devices in electrochemical cells and shoes and monitored the self-powered synthesis of Au nanoparticles and energy generation from human walking.

Component hydrogels can be prepared by simple radical polymerization of vinyl monomers with combinations of various commercially available charged polymers. Thus, the inventors' discovery will clearly open up broad opportunities for self-powered ionotronic devices.

The polymer hydrogel layer having the ion selectivity of the present disclosure allows selective movement of cations therethrough when an external pressure is applied, so only the soft polymer hydrogel layer is selectively compressed, whereby cations and anions dissolved inside the soft polymer hydrogel layer move toward the hard polymer hydrogel layer.

The compressed soft polymer hydrogel layer of the ionic hydrogel-based energy harvester can be restored to an initial state thereof when the external pressure is removed.

The soft polymer hydrogel layer of the ionic hydrogel-based energy harvester experiences repetitive compression and expansion when an external pressure or external vibration is repeatedly applied to the ionic hydrogel-based energy harvester, and the compression and expansion cause ions to move to the hard polymer hydrogel layer, whereby the ionic hydrogel-based energy harvester supplies electrical energy to an external component.

The ionic hydrogel-based energy harvester of the present disclosure may include but is not limited to, for example, sequentially layered hydrogels of a soft polyacrylamide (PAAm) hydrogel layer/crosslinked polyacrylic acid (PAAc) hydrogel layer/hard polyacrylamide (PAAm) hydrogel layer.

The ionic hydrogel-based energy harvester of the present disclosure may include but is not limited to, for example, sequentially layered hydrogels of a soft polyacrylamide (PAAm) hydrogel layer mixed with charged polyelectrolyte/ crosslinked polyacrylic acid (PAAc) hydrogel layer/hard polyacrylamide (PAAm) hydrogel layer mixed with charged polyelectrolyte.

In the ionic hydrogel-based energy harvester of the present disclosure, the charged polymer electrolyte can be selected from the group consisting of poly(sodium 4-styrenesulfonate) (PSS), sodium polyacrylic acid (PSA), and crystalline nanocellulose (CNC), but is not limited thereto.

The ionic hydrogel-based energy harvester of the present disclosure may have layered hydrogels with a total thickness in a range of 1 mm to 20 mm, preferably 5 mm to 15 mm, and more preferably 10 mm to 15 mm, but is not limited thereto. In addition, the thickness can be changed as needed.

The ionic hydrogel-based energy harvester of the present disclosure may have a structure in which the layered hydrogels are placed between two metal electrodes, for example, copper electrodes, attached to an acrylic plate, but is not limited to the structure.

The open circuit voltage, short circuit current density, and/or power of the ionic hydrogel-based energy harvester may increase as the vibration frequency of the energy harvester decreases, but the energy harvester is not limited to the properties.

For example, the ionic hydrogel-based energy harvester of the present disclosure can generate an open-circuit voltage of 12 mV and a short-circuit current density of 72.5 $\mu Acm^{-2}$ at a vibration frequency of 0.08 Hz but is not limited thereto.

Hereinafter, the present disclosure will be described in more detail through examples. However, the following examples are for illustrating the present disclosure, and the scope of the present disclosure is not limited thereto.

EXAMPLES

1. Materials and Methods

(1). Materials

Acrylic acid (AAc) and N,N,N',N'-tetramethylethylenediamine (TEMED) were purchased from Sigma-Aldrich. Acrylamide (AAm>98.0%) was purchased from Duksan Co, Korea. Potassium chloride (KCl) was purchased from Samchum Co, Korea. Sodium chloride (NaCl) and ammonium persulfate (APS) were purchased from Junsei Chemical Co., Japan. N,N'-Methylenebisacrylamide (MBAA) was provided by Tokyo Chemical Industry Co, Japan.

(2). Experimental Method

A polyacrylamide (PAAm) hydrogel was synthesized by free radical cross-polymerization from literature methods with minor modifications. During production, the amount of cross-linking agent (MBAA) was adjusted to control the stiffness of the produced hydrogel. For a soft PAAm gel, 3 g of acrylamide (monomer) and 10 mg of MBAA (cross-linking agent) were dissolved in 12 mL of NaCl (or KCl) aqueous solution. The concentration of NaCl (or KCl) was adjusted to the range of 0 M to 3.0 M.

The monomer solution was degassed in a vacuum oven at a temperature of 60° C. for 30 minutes and cooled to room temperature. Then, 100 µL of APS aqueous solution (initiator, 20% by weight) and 10 µL of TEMED (catalyst) were added to the solution. The reaction mixture was quickly cast into a circular glass mold with a 35 mm inner diameter and 4 mm thickness. Polymerization was carried out at room temperature for 30 minutes after covering the mold with a glass slide.

For a hard PAAm gel, the amount of MBAA (crosslinker) was increased to 250 mg while maintaining all other conditions. Similarly, a PAAc hydrogel was prepared. Briefly, 3 g of AAc (monomer) and 20 mg of MBAA (cross-linker) were dissolved in 12 mL of deionized water without dissolved salts. The monomer solution was degassed in a vacuum oven at a temperature of 60° C. for 30 minutes and cooled to room temperature.

Then, 100 µL of APS aqueous solution (initiator, 20% by weight) and 10 µL of TEMED (catalyst) were added to the solution. After casting in the same circular mold, polymerization was performed in an oven at a temperature of 70° C. for 1 hour.

The prepared hydrogels were layered in the order of PAAm (soft), PAAc, and PAAm (hard), and the PAAm (hard) hydrogel was generally located at the bottom. The total thickness of the three-layered hydrogel was 12 mm, and it consisted of 4 mm-thick PAAm(S), PAAc, and PAAm(H) hydrogels. For comparison, various three-layered hydrogels with different sequences were also prepared. The layered hydrogels were aged overnight before device fabrication and electrical measurements.

A device was fabricated by assembling layered hydrogels, two acrylic plates (5 cm×5 cm×0.5 cm), and two copper (Cu) electrodes First, two sheets of Cu foil (5 cm×6 cm) used as electrodes were attached to the surface of the acrylic plate with the use of Kapton films.

Then, the layered hydrogels were placed between two acrylic plates attached to Cu electrodes. At this step, each of the surfaces of the layered hydrogels was physically attached to each of the Cu electrodes, and the top and bottom of the acrylic plates were connected with the bent Kapton films to prevent the formation of an air layer between the layered hydrogels and the Cu electrodes during the compression-release cycles. After the assembly step, conductors were additionally connected to the Cu electrodes for electrical circuit measurements.

Field emission scanning electron microscopy (FE-SEM) images were obtained using Hitachi High-Technologies S-4800 equipment. Electrical performance was evaluated by applying cyclic external compression using linear motors of the PMC-1/2HS series at various frequencies.

Open-circuit voltage and short-circuit current were measured with a Keithley 6514 electrometer. To investigate the conductivity of the material, impedance spectroscopy was performed using a Bio-Logic VSP-300 potentiometer in the frequency range of 103 Hz to 107 Hz at an amplitude of 10 mV.

2. Experiment Result

A hydrogel-based ion conductor can be easily prepared by free radical polymerization of vinyl monomers in an aqueous electrolyte solution. In the present disclosure, an ionic PAAm hydrogel was synthesized by dissolving acrylamide monomer, cross-linking agent, and initiator in distilled water containing various electrolytes. Initially, NaCl was chosen as the model electrolyte, but other types of electrolytes such as LiCl and KCl were also tested later in the study.

(1). Preparation of Two Types of Electrolyte-Free Pure PAAm Hydrogels

First, two types of electrolyte-free pure PAAm hydrogels were prepared by adjusting the amount of cross-linker in the monomer solution while maintaining all other conditions. Pure PAAc hydrogels were also prepared in a similar manner (see experimental section for details).

As seen in the compression test in FIG. 2A, the stress-strain curves of PAAm and PAAc gels showed a linearly increased slope corresponding to applied stress of up to 30 kPa, followed by a region of a slightly decreased slope. Clearly, the PAAm hydrogel with higher crosslink density (blue) exhibited a higher compressive modulus (7.20 kPa), which is up to 3.7 times higher than the PAAm hydrogel with lower crosslinker (red, 1.94 kPa).

Considering that modulus is a measure of stiffness, the two PAAm hydrogels are denoted as PAAm(H) and PAAm(S), where H and S represent hard and soft, respectively. Additionally, the compressive modulus of PAAc hydrogel (green) was 3.69 kPa. Due to the different moduli, each hydrogel exhibits different deformation under the same applied stress.

Therefore, when three hydrogels are layered in the order of PAAm(S)/PAAc/PAAm(H) and compressed by external pressure, the degree of compression of each component hydrogel may be different. As a result, directional ion transport through the layered gels can be induced, which will be discussed later.

(2). Cyclic Compression Tests of Layered PAAm(S)/PAAc/PAAm(H) Hydrogels

As a next step, cyclic compression tests of layered PAAm(S)/PAAc/PAAm(H) hydrogels were performed at a maximum compression strain of 25%. In FIG. 2B, the hysteresis loop of the continuous loading-unloading process is maintained without noticeable changes, showing the reversible shape recovery of the accumulated gel. It is worth noting that the layered gels ruptured above 30% strain, probably due to internal fractures of the polymer chains. Therefore, in this study, the upper limit of compressive strain was set at 25%.

As a preliminary study on ion transport, NaCl was added as a model electrolyte to PAAm(S) and PAAm(H) hydrogels, and the resulting ionic conductivity was investigated and is shown in FIG. 2C. In general, ionic conductivity is proportional to the concentration and mobility of ions while the type of electrolyte and solvent are determined. Therefore, the conductivity (a) of the PAAm hydrogel corresponding to the flat region in FIG. 2C increased linearly with NaCl concentration. Interestingly, the conductivity of PAAm(S) gel (solid line) is always higher than the conductivity of PAAm(H) gel (dashed line) at the same NaCl concentration. This is probably due to the decrease in ion mobility in the denser polymer network than in the PAAm(H) hydrogel.

When two ion-conducting PAAm(S) and PAAm(H) hydrogels (containing [NaCl]=2.0 M) were layered together with NaCl-free pure PAAc hydrogel, the layered PAAm(S)/PAAc/PAAm(H) hydrogels showed a conductivity value of 0.056 S/cm$^2$ (FIG. 2D).

When the conductivity of the layered gels can be calculated by simply averaging the conductivity of PAAm(S) hydrogel (red in FIG. 2F, $\sigma$=0.092 S/cm$^2$), the conductivity of PAAm(H) (blue, $\sigma$=0.073 S/cm$^2$) and PAAc hydrogel (green, $\sigma$=0.0058 S/cm$^2$), the average value was 0.057 S/cm$^2$. That is, the measured conductivity of the layered gels (0.056 S/cm$^2$) was the same as the theoretically calculated average value (0.057 S/cm$^2$). This fact means that ions are effectively transported through the layered gels even though the individual hydrogels are physically attached to each other.

Figure 3:
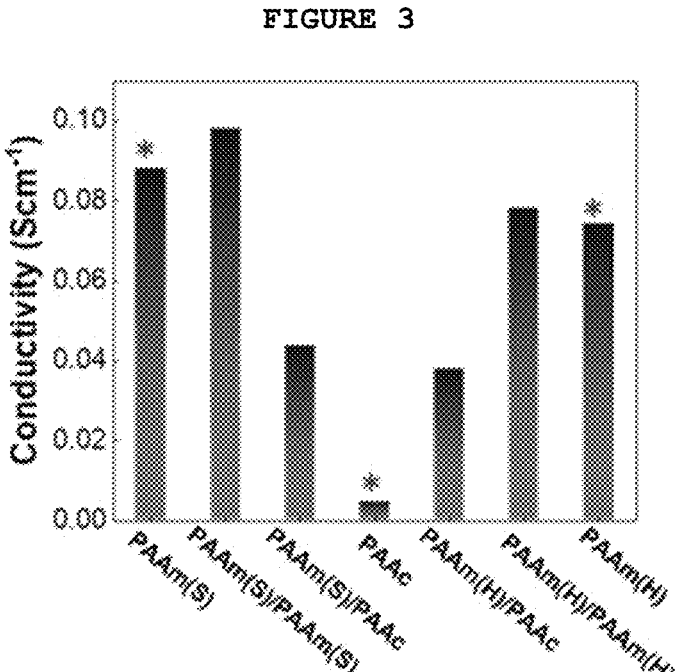
FIG. 3 shows the ionic conductivity of various hydrogels with different compositions, the concentration of NaCl was adjusted to 2.0 M for both PAAm(S) and PAAm(H) hydrogels and 0.0 M for PAAc hydrogel, and individual PAAm(S), PAAm(H), and PAAc hydrogels are indicated with an asterisk (*)

Ion transport through the hydrogel interface was further confirmed by comparing the conductivities of bilayer hydrogels of PAAm(S)/PAAm(S), PAAm(H)/PAAm(H), PAAm(S)/PAAc, and PAAm(H)/PAAc (FIG. 3).

(3). Energy Harvesting Performance of Layered PAAm(S)/PAAc/PAAm(H) Hydrogels The energy harvesting performance of layered PAAm(S)/PAAc/PAAm(H) hydrogels was investigated on the basis of the results on mechanical properties and ion transport. For the investigation, PAAm(S), PAAm(H), and PAAc hydrogels were bonded when each hydrogel with the same thickness of 4 mm (diameter=35 mm), and the total thickness of the layered hydrogels was adjusted to 12 nm.

Additionally, for comparison, other hydrogels with a different three-layered structure but the same thickness were also prepared. The layered hydrogels were assembled between two acrylic plates with Cu electrodes and conductive wires (FIG. 4; see details in the experimental section), The PAAm(H) hydrogel was typically placed on the bottom of the acrylic plate. The assembled device was repeatedly compressed and released by a linear motor with a representative frequency of 0.3 Hz. Here, vibrations observed in nature, such as waves, wind, and human walking, generally have low frequencies (<1 Hz). Given this fact, the present experimental conditions could potentially be suitable for extracting electrical energy from environmental vibrations.

Initially, the assembled device was compressed until the thickness of the layered PAAm(S)/PAAc/PAAm(H) hydrogels decreased from 12 mm to 9 mm. As can be seen in the photograph of FIG. 4A, the thickness and area of each hydrogel in the compressed state were not the same because the stiffness of each gel was different (FIG. 2A).

Figures 4A, 4B, 4C, 4D, 4E, 4F:
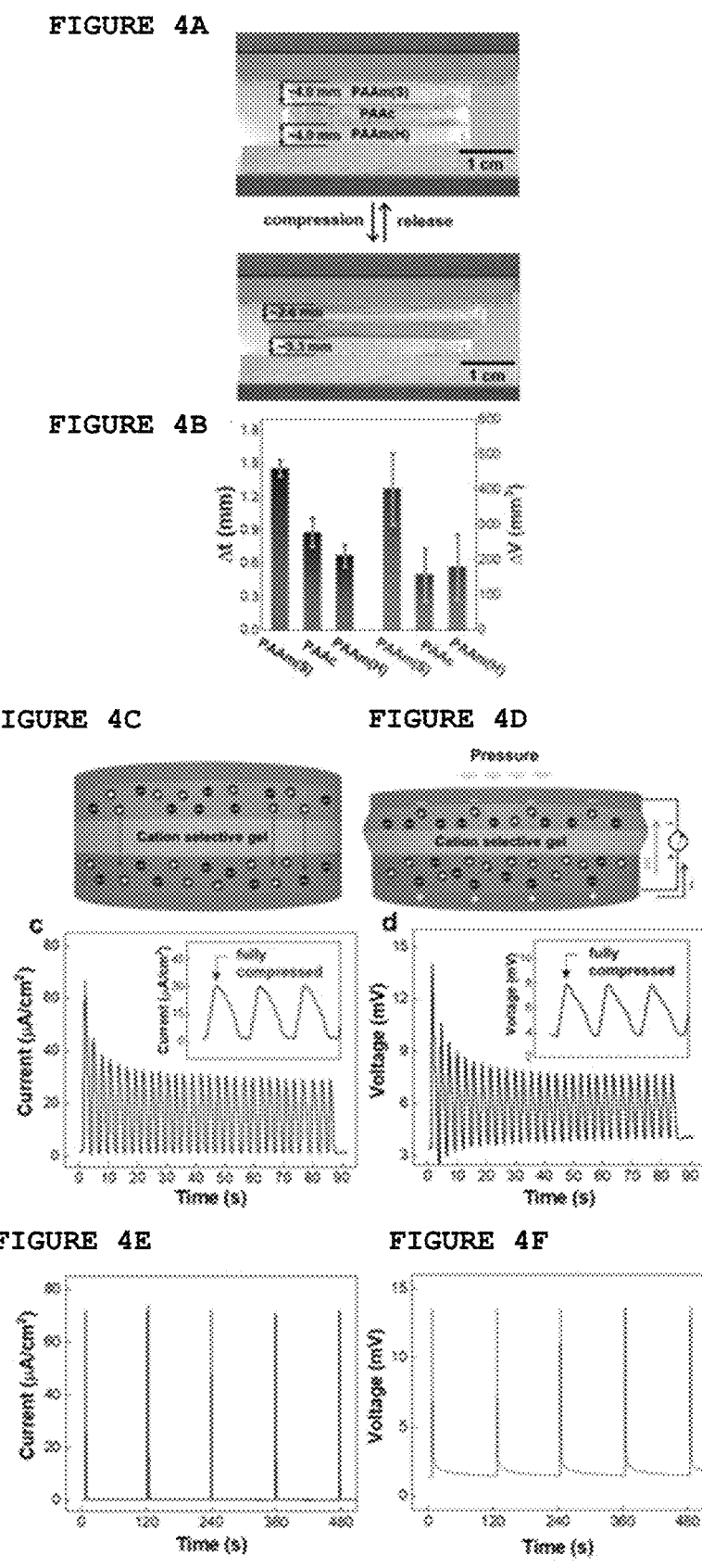
FIG. 4A shows photographic image of PAAm(S)/PAAc/PAAm(H) hydrogels under compressed and released states.
FIG. 4B shows changes in thickness (blue color) and volume (red color) of component hydrogels within stacked structure between the compressed and released states.
FIGS. 4C to 4F show the short-circuit current density (FIGS. 4C and 4E), output voltage (FIGS. 4D and 4F), and Hz (FIGS. 4E and 4F) of a hydrogel-based device under the conditions of vibration frequency at 0.3 Hz (FIGS. 4C and 4D) and at 0.08 Hz (FIGS. 4E and 4F), respectively, while being in compression-release cycles.

The thickness changes of PAAm(S), PAAc, and PAAm(H) in the layered structure under repeated compression-release cycles were estimated to be 1.46 mm, 0.88 mm, and 0.67 mm, respectively (blue in FIG. 4B), and the corresponding volume changes in the hydrogels were 402 mm$^3$, 158 mm$^3$, and up to 180 mm$^3$, respectively (red in FIG. 4B). Obviously, the degree of volume reduction of PAAm(S) hydrogel was much higher than the degree of volume reduction of PAAm(H). Therefore, under compression, NaCl dissolved in the hydrogel could move from the upper PAAm(S) to the lower PAAm(H), allowing directional ion transport.

On the other hand, when the external pressure is released, the volume of the compressed hydrogel could recover to the initial state thereof, redirecting the ion transport back toward the upward PAAm(S) direction until the initial concentration was again reached. Under repeated compression-release cycles, the upward and downward movement of ions was converted into a measurable electrical signal. In FIGS. 4C and 4d, the short-circuit current ($I_{SC}$) and open-circuit voltage ($V_{OC}$) showed periodic changes synchronized with the compression-release cycles. Both $I_{SC}$ and $V_{OC}$ showed maximum values when the device was fully compressed, as shown in the inserted graph (FIGS. 4C and 4D).

The average current density and peak-to-peak $V_{OC}$ values reached 31.2 $\mu Acm^{-2}$ and 4.6 mV, respectively, at a vibration frequency of 0.3 Hz. The inventors also found that the electrical output of the device was driven by volume change in the hydrogels. Accordingly, the inventors noted that both $I_{SC}$ and $V_{OC}$ could be systematically controlled by the compressed thickness of the layered hydrogels (FIG. 5).

Figures 6A, 6B, 6C, 6D, 6E, 6F:
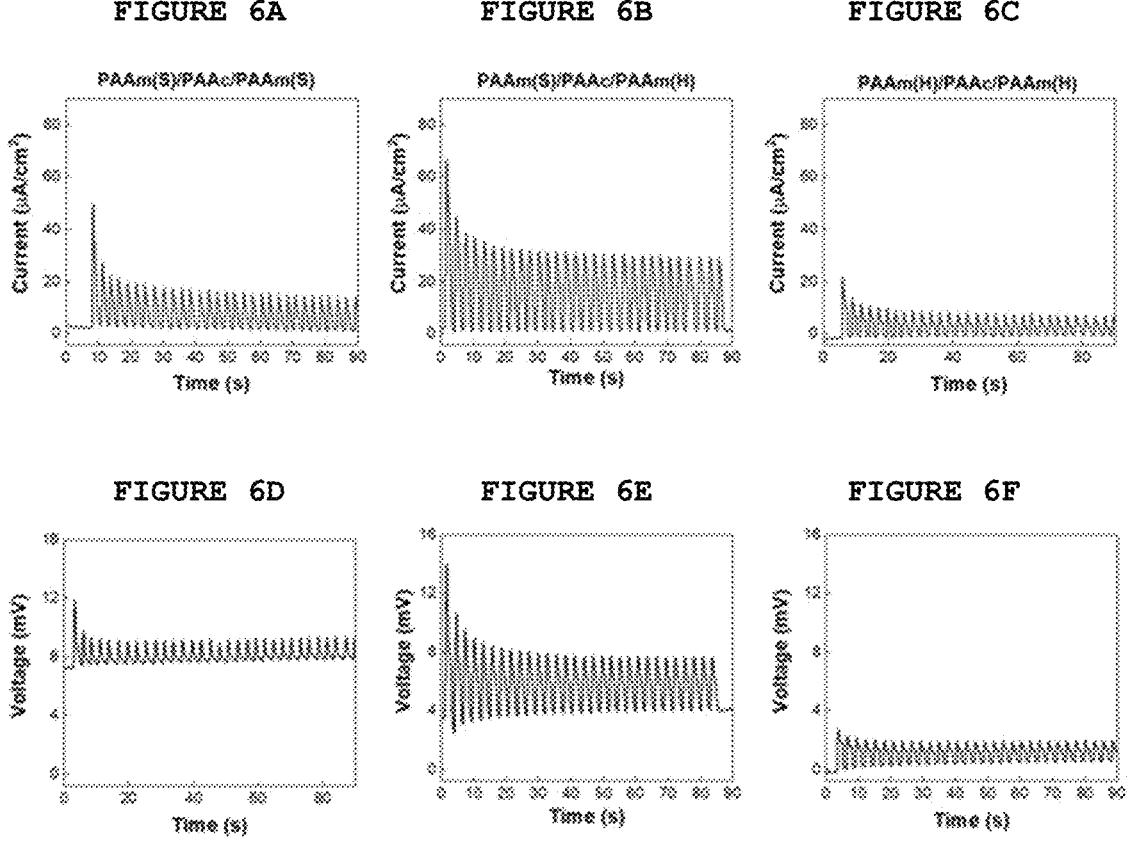
FIGS. 6A and 6D, FIGS. 6B and 6E, and FIGS. 6C and 6F show the results of a PAAm(S)/PAAc/PAAm(S) hydrogel, a PAAm(S)/PAAc/PAAm(H) hydrogel, and a PAAm (H)/PAAc/PAAm(H) hydrogel, respectively.

For comparison, layered hydrogels, that was, PAAm(S)/PAAc/PAAm(S) and PAAm(H)/PAAc/PAAm(H), were prepared without adjusting the stiffness of the PAAm gel. The $I_{SC}$ and $V_{OC}$ values were significantly reduced in this sample (FIG. 6), indicating that a large amount of ion transport could be realized through heterogeneous compression of the PAAm(S) and PAAm(H) layers.

Figures 7A, 7B:
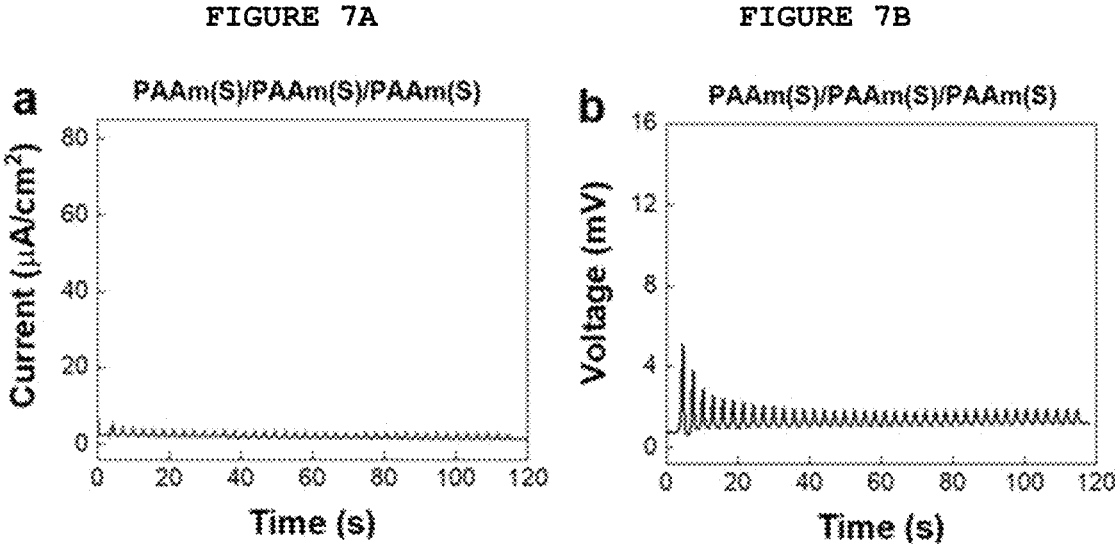
FIG. 7A shows the short-circuit current density of a device with a PAAm(S)/PAAm(S)/PAAm(S) hydrogel.
FIG. 7B shows the open circuit voltage of a device with a PAAm(S)/PAAm(S)/PAAm(S) hydrogel.

Additionally, in the proposed harvester, the presence of PAAc hydrogel in the middle of the layered structure played a critical role. When layered PAAm(S)/PAAm(S)/PAAm(S) hydrogels without the PAAc layer were prepared, the electrical output was almost negligible (FIG. 7). This highlighted the importance of the ion-selective properties of the intermediate PAAc hydrogel.

Unfortunately, the layered PAAm(H)/PAAm(H)/PAAm (H) hydrogels were too brittle and ruptured under the same compression. However, the three-layered hydrogels with only PAAm(H) do not have energy harvesting properties as in the previous example.

The ion selectivity of the PAAc hydrogel varies depending on pH. As the pH value increases, the ion selectivity increases because the deprotonation of the carboxylic acid (—COOH) of the PAAc hydrogel increases, and as a result, both $I_{SC}$ and $V_{OC}$ extracted from the layered PAAm(S)/PAAc/PAAm(H) hydrogels increased (FIG. 8).

Figure 9G:
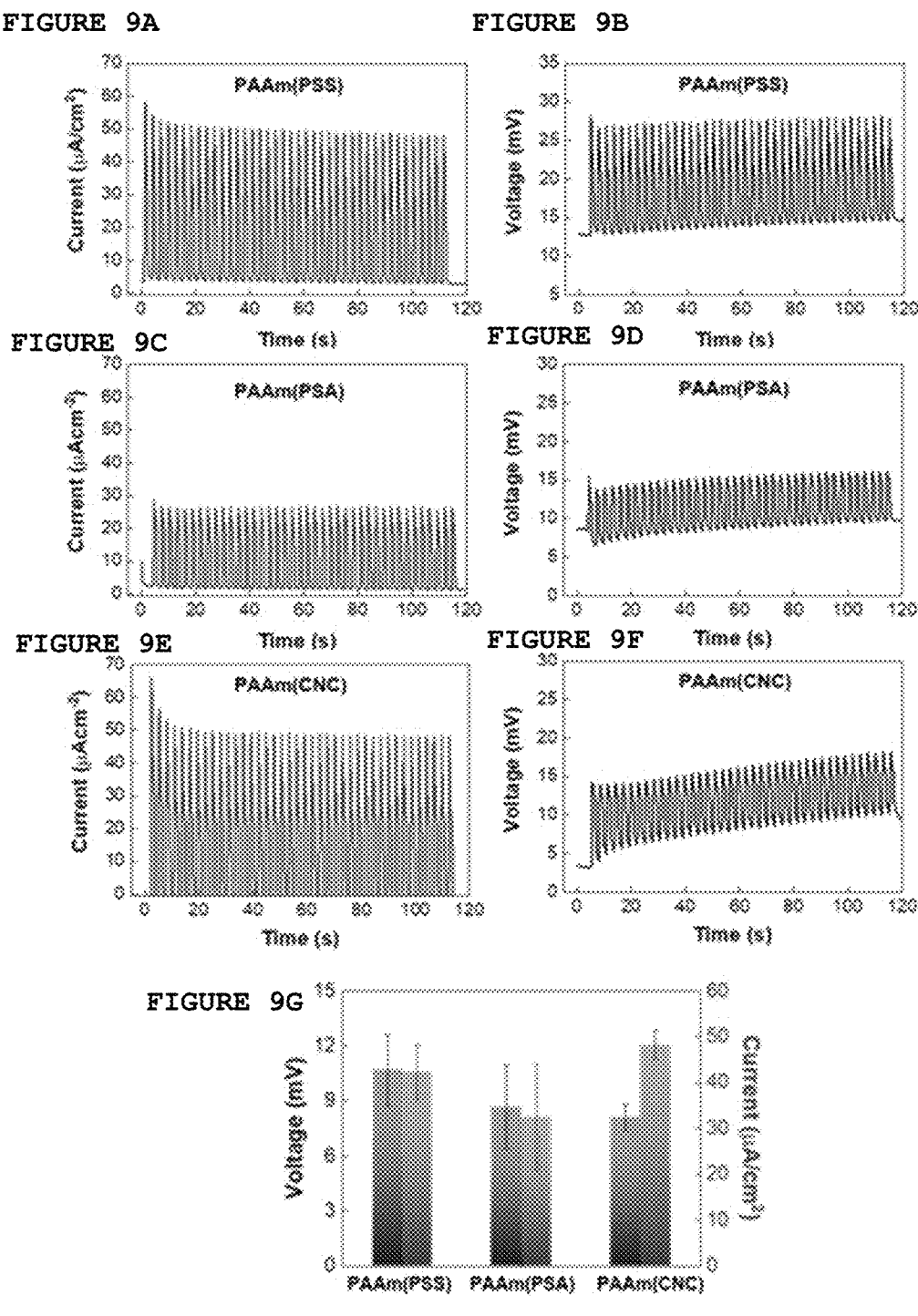
FIG. 9G shows the average electrical outputs observed from hydrogel devices employing various types of cation-selective hydrogels.

However, the mechanical properties and chemical stability of PAAc hydrogel deteriorated under high pH conditions, limiting the applicability of pH control. Additionally, even in the case of layered hydrogels such as other types of cation-selective hydrogels (examples: PAAm hydrogels mixed with poly(sodium 4-styrenesulfonate), sodium polyacrylate, or crystalline nanocellulose), it was observed that energy harvesting performance was maintained or improved. Therefore, various ionic hydrogels could replace the intermediate PAAc hydrogel (see detailed results in FIG. 9).

(4). Energy Harvesting Mechanism

The energy harvesting mechanism in FIG. 4 could be understood as follows. In the compressed state, Na⁺ and Cl⁻ dissolved in the top PAAm(S) gel move toward the bottom PAAm(H) gel. However, the ion selectivity of the PAAc gel in the middle could allow the transport of Na⁺ cations, but the transport of Cl⁻ anions was inhibited, resulting in a charge imbalance in the top and bottom of the PAAm gels.

The upper PAAm(S) gel was rich in Cl⁻ and had a negative charge, while the lower PAAm(H) gel was rich in Na⁺ and had a positive charge. As a result, an electric field could be generated from PAAm(H) to PAAm(S).

Although the electric field formed in this way was temporary, the electric field could redistribute the local concentration of ions within the hydrogels. As shown in FIG. 4, Na⁺ of the upper PAAm(S) gel moved toward the upper Cu electrode by the generated electric field, while Cl⁻ of the lower PAAm(H) gel moved toward the lower Cu electrode.

As a result, an electric double layer (EDL) could be created between the upper PAAm(S) gel-electrode and the lower PAAm(H) gel-electrode interface. Therefore, because the bottom electrode had a higher potential than the top electrode, the potential difference could drive current flow with measurable $V_{OC}$ and $I_{SC}$ as shown in FIG. 4.

When the external force was removed, all processes could be reversed due to the volume expansion of the component gels. This reverse process could reduce the generated $V_{OC}$ and $I_{SC}$ by eliminating the charge imbalance in the component gels as well as the EDL at the gel-electrode interface.

In the measurements, the inventors connected the positive probe of an electrometer to the bottom Cu electrode. Therefore, the positive current and voltage in FIGS. 4A and 4C matched well with the charge polarity of the proposed mechanism. Conversely, when the positive probe of the electrometer was connected to the top electrode, both current and voltage were reversed (FIGS. 11A and 11B).

Interestingly, the amplitudes of $V_{OC}$ and $I_{SC}$ decreased in the initial cycle and reached stable values in sustained compression-release cycles (FIGS. 4C and 4D). This behavior was associated with the delayed movement of ions. That is, both Na⁺ and Cl⁻ were bound to the metal electrodes in the EDL, and for the ions to move in the up and down directions during the compression-release process, the ions in the EDL were required to be separated from the metal electrodes, but this process involved a time delay.

Therefore, at relatively high compression-release frequencies, not all ions bound to the electrodes could contribute to the output signal. The stable $V_{OC}$ and $I_{SC}$ values in FIGS. 4C and 4D were the result of the kinetic equilibrium of ion motion at a given frequency. This argument can be supported by the following observation. (a) The maximum electrical output corresponding to the maximum number of ions transported was obtained in the first compression-release cycle since the EDL was not set in the first compression. (b) The baseline of the output voltage also stabilized after the initial increase, which may be due to the accumulation of ionic charges on the metal electrodes with the compression-release cycle.

Interestingly, by reducing the vibration frequency from 0.3 Hz to 0.06 Hz, both $V_{OC}$ and $I_{SC}$ values gradually increased as shown in FIGS. 12A and 12B. Additionally, in the first compression, the electrical output increasingly approached the saturation value because the bound ions could dissociate to a greater extent from the metal electrodes at lower frequencies (FIGS. 12A and 12B).

Ultimately, the device assembled at a vibration frequency of 0.08 Hz exhibited constant $V_{OC}$ and $I_{SC}$ peaks without decay behavior with a current density of 72.5 $\mu Acm^{-2}$ and an output voltage of 12 mV, respectively (FIGS. 4E and 4F). This output performance was competitive with or even exceeded the record-high performance of existing energy harvesters at similar frequencies discussed later. Additionally, due to the difference between the initial value and the stabilized $V_{OC}$ and $I_{SC}$ values, the stabilized values are referred to in the following discussion unless otherwise noted.

(5). Concentration-Dependent Performance of Layered Hydrogel Devices

Figures 10A, 10B, 10C, 10D, 10E:
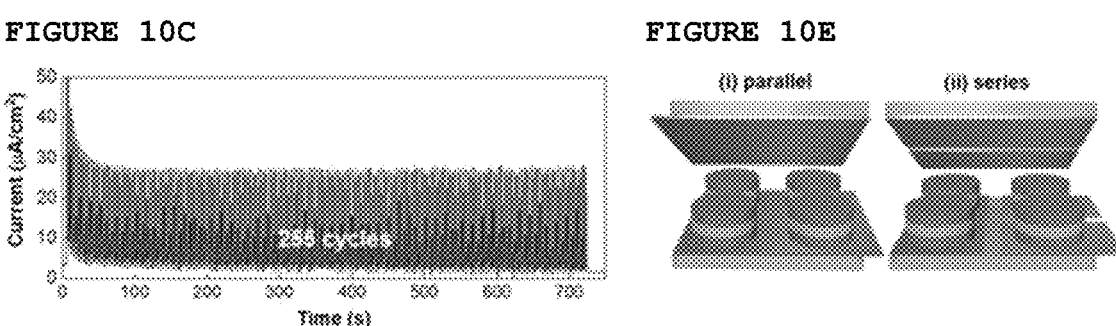
FIGS. 10A and 10B show the open circuit voltage (blue) and short-circuit current density (red) depending on the concentration of electrolyte introduced into a PAAm(S)/PAAc/PAAm(H) hydrogel (FIG. 10A) and on the type of electrolyte (FIG. 10B), asterisks (*) indicate that $V_{OC}$ and $I_{SC}$ have negative values.
FIG. 10C shows the result of a stability test with a hydrogel device in continuous compression-release cycles.
FIGS. 10D and 10E show the open circuit voltage (blue) and short circuit current of devices with different numbers of layered hydrogels in parallel and series connections.

Since the output current and voltage of a device according to the present disclosure are mainly determined by the number of transported ions, the present inventors studied the concentration-dependent performance of the layered hydrogel device (FIG. 10A).

PAAm(S)/PAAc/PAAm(H) hydrogels prepared in the absence of NaCl produced negligible output current with a slightly negative voltage (up to −0.85 mV) upon compression. The negative potential appeared to be related to the movement of protons, but the underlying principle was not clearly understood at this step.

With increasing NaCl concentration in both PAAm(S) and PAAm(H) hydrogels, both $V_{OC}$ and $I_{SC}$ values became positive, albeit monotonically, but eventually decreased at higher concentrations ([NaCl]=3.0 M).

Because the number of ions transported under a given compression increases with NaCl concentration, the monotonic increases shown in FIGS. 12A and 12B would be a direct result of the ion transport discussed in the layered gel system. Conversely, the output performance was reduced at high NaCl concentration ([NaCl]=3.0 M). This may be because the negative charge of PAAc was screened out at higher NaCl concentrations, which reduced the ion selectivity of the PAAc hydrogel. Similar trade-offs with respect to electrolyte concentration have often been reported in membrane-based salinity gradient development.

(6). Effect of Electrolyte Type

Next, the effect of electrolyte type was studied (FIG. 10B). In this series of experiments, the output performance of the layered hydrogels was compared by changing the electrolyte to LiCl, KCl, and NaCl. Because the electrolyte had a common anion (Cl⁻), device performance could be largely determined by the type of cation.

In this regard, it should be noted that cations are hydrated in the hydrogel and the hydration radius of cations decreases in the following order: Li⁺ (3.82 Å)>Na⁺ (3.58 Å)>K⁺ (3.31 Å). As the hydrated ionic radius decreases, the ion mobility increases in the following order: Li⁺<Na⁺<K⁺.

Initially, the inventors predicted that cations with higher mobility could generate more electrical output. However, the measured $V_{OC}$ and $I_{SC}$ values increased in a different order: Li⁺<K⁺<Na⁺ at a compression-release frequency of 0.3 Hz (FIG. 10B).

This result indicated that there might be additional contributions to the observed order. According to recent theoretical calculations, the strength of the bond between cations and metal electrodes varies depending on the type of ions, and the performance observed in the cases of the bond with Na⁺ and K⁺ was thought to be related to this bond strength. However, the underlying principle was not clearly understood at this step.

This discussion led the inventors to suggest that the effects of metal salts would be strongly linked to kinetic factors. In this sense, the present inventors lowered the decompression frequency to check whether the influence of dynamic factors could be alleviated, as in the previous results (FIGS. 4E and 4F).

Remarkably, at a vibration frequency of 0.08 Hz, the $V_{OC}$ and $I_{SC}$ values of the layered hydrogels with different electrolytes became very similar to each other, with a current density of 25 $\mu$Acm⁻² and an output voltage of 5 mV, respectively.

Based on concentration and electrolyte dependence studies, the layered hydrogels containing 2.0 M concentration of NaCl provided optimized performance and were selected for the following demonstration. Additionally, under optimized conditions, the electrical output of the layered hydrogels was shown to be maintained without noticeable degradation for 255 cycles (FIG. 10C).

These results demonstrated the stability and durability of the hydrogel-based device and were in good agreement with the mechanical tests in FIG. 2B. Studies were conducted to increase electrical output by treating the layered PAAm(S)/PAAc/PAAm(H) hydrogels as individual chemical cells and connecting them in parallel or series (FIGS. 10D and 10E). As the number of cells increased in the parallel connection, $I_{SC}$ increased linearly from 278 $\mu$A to 966 $\mu$A, while V co remained approximately the same (average value=4.0 mV). Alternatively, in the series connection, $V_{OC}$ increased linearly from 4.5 mV to 19.1 mV, but $I_{SC}$ changed little with the change in cell number (average value=338 $\mu$A).

As with the single-cell device, several factors could affect the electrical performance of a multi-cell device. Among various factors, the present inventors evaluated the practical aspects of a hydrogel device by controlling the vibration frequency.

Figures 13A, 13B, 13C, 13D, 13E:
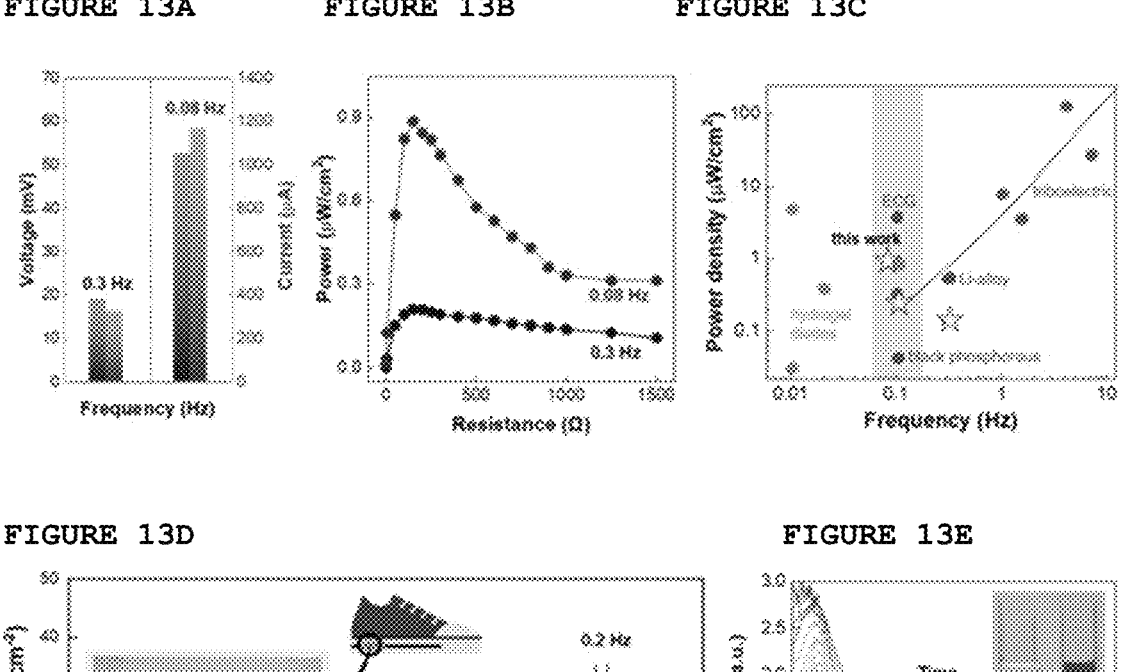

In FIG. 13A, the hydrogel device consisting of four cells of PAAm(S)/PAAc/PAAm(H) in series connection generated an output voltage of 19.1 mV and a current of 327 $\mu$A at a frequency of 0.3 Hz. At a frequency of 0.08 Hz, the device's performance was greatly increased to the extent of an output voltage of 52.7 mV and a current of 1170 $\mu$A. Based on frequency-dependent performance, the output power was measured by connecting the hydrogel device with a four-cell configuration to various external resistances (R).

As can be seen in FIG. 13, as the external resistance increased, the output voltage increased but the current density decreased. As a result, the maximum power density occurred at an intermediate resistance of 150Ω, with values of 0.21 $\mu$W/cm² (blue in FIG. 13B) and 0.89 $\mu$W/cm² (red in FIG. 13B) at a frequency of 0.3 Hz and at 0.08 Hz, respectively.

In contrast, the maximum power of conventional triboelectric and piezoelectric generators was obtained at much higher resistances (>10 6Ω). The power delivered to an external load could be maximized when the source resistance matched the load resistance. Thus, the hydrogel device of the present disclosure, which had a lower matching resistance compared to triboelectric and piezoelectric generators, might be more suitable for commercial electronic circuits and devices. It was determined that the low matching resistance of the device according to the present disclosure was due to the low internal resistance of the hydrogel.

In FIG. 13C, the power density of the hydrogel device was compared to the power density of a recently reported high-performance energy harvester. For a better comparison, the power density reported in several different ways in the literature was recalculated by multiplying the open-circuit voltage and short-circuit current density obtained from the literature data (power=$V_{OC}$×$I_{SC}$).

In the case of the friction generator (blue), output performance decreased monotonically as the vibration frequency decreased. The performance of triboelectric generators has been mostly reported at frequencies above 1 Hz, as the generators were inefficient at picking up low-frequency vibrations.

Meanwhile, the performance of recent ion energy harvesters, such as hydrogel diodes (pink), lithium alloy-based composites (green), and 2D black phosphorus nanosheets (green), have been reported at vibration frequencies below 1 Hz. It could be verified that the power density of our hydrogel device (yellow star) in the comparable vibration frequency region (gray) was competitive with or higher than the power density of state-of-the-art high-performance energy harvesters.

(7). Practical Applications of Hydrogel Device

After verifying the low-frequency energy harvesting performance, the inventors attempted to apply a hydrogel device to practical applications. In the first experiment, the present inventors implanted a hydrogel device into the soles of shoes and showed electricity generation during human walking (FIG. 13D).

For the experiment, a 9 mm thick plastic (poly(lactic acid)) block was installed on the surface of the acrylic plate at the bottom of the hydrogel device (see inset photo). This prevented the layered hydrogels from rupturing when walking. Since the layered hydrogels had a thickness of 12 mm, each walking step could induce compression of 3 mm thickness, which was equivalent to the thickness change in FIG. 4.

Since the volume of the layered hydrogels did not change when a person was standing, no noticeable current was generated. On the other hand, executing walking with a step frequency of 1.3 Hz produced electrical output with a current density of up to 7 $\mu A/cm^2$. The output current increased as the walking speed decreased.

This behavior highlights the hydrogel device's ability to harvest energy from human movement in the low-frequency range. In particular, at a step frequency of 0.2 Hz, the current density reached up to 30 $\mu A/cm^2$, which was a value quite similar to the current density of a linear motor.

(8) Self-Powered Electrochemical Synthesis of Au Nanoparticles

In the following set of experiments, the electrochemical synthesis of Au nanoparticles was demonstrated. For the experiments, the upper and lower Cu electrodes of the hydrogel device were connected to the $HAuCl_4$ aqueous solution using a conductive jumper wire.

Then, a hydrogel device was continuously compressed at a frequency of 0.3 Hz to induce electrochemical reduction of $HAuCl_4$ into Au nanoparticles. As seen in the UV-Vis spectrum (FIG. 13E), a new absorption peak appeared at a wavelength of 550 nm, corresponding to the localized surface plasmon resonance (LSPR) of the Au nanoparticles. The intensity of the absorption increased depending on continuous compression-release cycles.

Figures 14A, 14B, 14C:
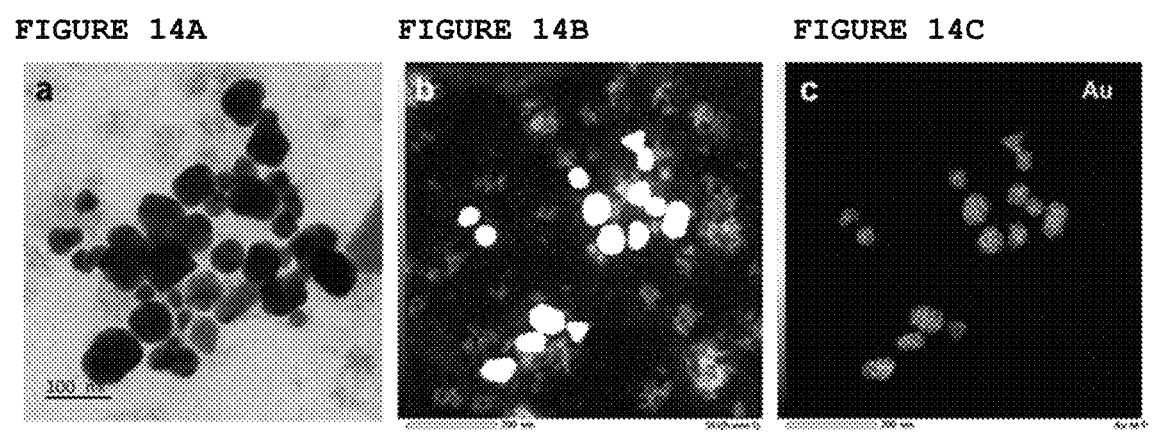

As can be seen in the transmission electron microscope (TEM) image (FIG. 14), the synthesized Au nanoparticles had a polyhedral shape with a dimension of several tens of nanometers. Base mapping using energy-dispersive X-ray spectroscopy further confirmed the synthesis of Au nanoparticles.

When the hydrogel device was connected to the $HAuCl_4$ solution under the same conditions and without a compression-release procedure, the UV-Vis spectrum of the $HAuCl_4$ solution remained the same with no LSPR peak appearing.

3. Conclusion

The present inventors demonstrated an ionic device capable of harvesting energy from low-frequency mechanical vibrations based on ion transport in a polymer hydrogel. To optimize the output performance of the ion energy harvester, the hydrogel-based device of the present disclosure focuses on optimizing (a) the amount of ion transport by the stiffness of the PAAm hydrogel and (b) the charge separation of the transported ions by ion selectivity.

There was direction in the experiment using layered hydrogels by adjusting various experimental conditions. However, selective ion transport has been systematically explored to understand and optimize the mechanoelectrical conversion procedure.

In many respects, the experimental results were controlled by the slow diffusion rates of ions and ion-electrode interactions, and the experiments revealed the dynamics of device performance. Interestingly, by lowering the vibration frequency, more ions were transported effectively, leading to continued improvement in device performance.

The retardation effect of ions due to kinetic factors was found to disappear at a vibration frequency of 0.08 Hz. Regardless of the experimental conditions, electrical output was maximized. As practical applications, energy generation from human walking and electrochemical synthesis of Au nanoparticles were further presented.

The presented hydrogel device can be manufactured by simple polymer synthesis without complex material synthesis and device design. Thus, the present disclosure clearly provides a blueprint for the future development of hydrogel-based ion energy harvesters as soft and flexible power sources for self-powered applications in the low-frequency range.

As described above, specific parts of the content of the present disclosure have been described in detail. For those skilled in the art, it will be obvious that these specific techniques are merely preferred examples and do not limit the scope of the present disclosure.

Accordingly, the substantial scope of the present disclosure will be defined by the appended claims and their equivalents. Simple modifications or changes to the present disclosure can be easily used by those skilled in the art, and all such modifications or changes can be considered to be included in the scope of the present disclosure.

INDUSTRIAL APPLICABILITY

By manufacturing an energy device by simply layering polymer hydrogels, an ionic hydrogel-based energy harvester is very superior to existing methods in terms of extracted current density, manufacturing cost, and manufacturing method. Since the ionic hydrogel-based energy harvester can be prepared with simple knowledge of polymer chemistry without complex material synthesis and device design, the ionic hydrogel-based energy harvester is utilized as a soft and flexible power source for many self-powering applications in the low-frequency range.

The invention claimed is:

1. An ionic hydrogel-based energy harvester comprising layered hydrogels, the ionic hydrogel-based energy harvester comprising:

a soft polymer hydrogel layer;

a polymer hydrogel layer layered on the soft polymer hydrogel layer and having ion selectivity; and a hard polymer hydrogel layer layered on the polymer hydrogel layer having ion selectivity.

2. The ionic hydrogel-based energy harvester of claim 1, wherein the polymer hydrogel layer having the ion selectivity allows selective movement of cations therethrough.

3. The ionic hydrogel-based energy harvester of claim 1, wherein only the soft polymer hydrogel layer is selectively compressed when an external pressure is applied to the energy harvester, whereby cations and anions dissolved in the soft polymer hydrogel layer move toward the hard polymer hydrogel layer.

4. The ionic hydrogel-based energy harvester of claim 3, wherein the compressed soft polymer hydrogel layer is restored to an initial state thereof when the external pressure is removed.

5. The ionic hydrogel-based energy harvester of claim 1, wherein the soft polymer hydrogel layer of the ionic hydrogel-based energy harvester experiences repetitive compression and expansion when an external pressure or external vibration is repeatedly applied to the ionic hydrogel-based energy harvester, and the compression and expansion cause ions to move to the hard polymer hydrogel layer, whereby the ionic hydrogel-based energy harvester supplies electrical energy to an external component.

6. The ionic hydrogel-based energy harvester of claim 1, wherein the soft polymer hydrogel layer is a soft polyacrylamide (PAAm) hydrogel layer, the hard polymer hydrogel layer is a hard polyacrylamide (PAAm) hydrogel layer, and the polymer hydrogel layer having ion selectivity is a polyacrylic acid (PAAc) hydrogel layer.

7. The ionic hydrogel-based energy harvester of claim 1, wherein the soft polymer hydrogel layer is a soft polyacrylamide (PAAm) hydrogel layer, the hard polymer hydrogel layer is a hard polyacrylamide (PAAm) hydrogel layer, and the polymer hydrogel layer having the ion selectivity is a layer made of a mixture of polyacrylamide and a charged polymer electrolyte.

8. The ionic hydrogel-based energy harvester of claim 7, wherein the charged polymer electrolyte is selected from the group consisting of poly(sodium 4-styrenesulfonate), sodium polyacrylic acid, and crystalline nanocellulose.

9. The ionic hydrogel-based energy harvester of claim 1, wherein the layered hydrogels have a total thickness in a range of 1 mm to 20 mm.

10. The ionic hydrogel-based energy harvester of claim 1, wherein the layered hydrogels are placed between two metal electrodes attached to an acrylic plate.

11. The ionic hydrogel-based energy harvester of claim 1, wherein open circuit voltage, short circuit current density, and power of the energy harvester increase as vibration frequency of the energy harvester decreases.

12. A self-powered ionotropic device comprising the ionic hydrogel-based energy harvester of claim 1.

* * * * *